（12） United States Patent
Moser

(10) Patent No.: US 12,291,403 B2
(45) Date of Patent: May 6, 2025

(54) SEPARATING APPARATUS FOR PROFILES

(71) Applicant: MOST Technik GmbH, St. Konrad (AT)

(72) Inventor: Friedrich Moser, Scharnstein (AT)

(*) Notice: Subject to any disclaimer, the term of this patent is extended or adjusted under 35 U.S.C. 154(b) by 0 days.

(21) Appl. No.: 18/035,060

(22) PCT Filed: Aug. 3, 2022

(86) PCT No.: PCT/AT2022/060271
§ 371 (c)(1),
(2) Date: May 2, 2023

(87) PCT Pub. No.: WO2023/039622
PCT Pub. Date: Mar. 23, 2023

(65) Prior Publication Data
US 2025/0074717 A1   Mar. 6, 2025

(30) Foreign Application Priority Data
Sep. 20, 2021 (AT) .............. A 50736/2021

(51) Int. Cl.
*B65G 59/12* (2006.01)
*B65G 47/248* (2006.01)

(52) U.S. Cl.
CPC ................. *B65G 47/248* (2013.01)

(58) Field of Classification Search
None
See application file for complete search history.

(56) References Cited

U.S. PATENT DOCUMENTS 2,993,606 A * 7/1961 Helstrom ........... B65G 47/1492
414/745.9
4,150,742 A * 4/1979 Pretsch ................... B65G 59/12
198/461.1

(Continued)

FOREIGN PATENT DOCUMENTS

| AT | 525478 A1 * | 4/2023 | ......... B65G 47/1492 |
| DE | 2320033 A1 | 10/1974 | |
| EP | 0365102 A1 | 4/1990 | |

*Primary Examiner* — Joseph A Dillon, Jr.
(74) *Attorney, Agent, or Firm* — Tiajoloff & Kelly LLP

(57) ABSTRACT

A separating device for profiles (6) comprises transfer means (8) between supporting surfaces (13) of successive transverse conveyors (1, 2, 3) that have receptacles (11) for a plurality of profiles (6). The receptacles are displaceable in rotary steps of a shaft (9) between a pick-up position and a handover position and form a driver surface (12) that, in the pick-up position, engages under only one profile (6). Stop cams (14) for the profiles (6) are associated with the receptacles (11), and stop points (16) determining the contour (15) of the stop cams (14) define an angle of rotation (a) of the stop cams (14) and a distance (h) from the bearing surface (13) of the transverse conveyor (1, 2, 3). The rear boundary edge (18) of the bearing surface (17), which is determined by the stop points (16) as a function of the cross-sectional shape and size of the profiles (6), is at least at the same distance from the shaft (9) as the outer end (19) of the driver surface (12). The transverse conveyors (1, 2, 3) can be controlled as a function of the stop of the profiles (6) at a stop cam (14) rotated into the rotational position for the cross-sectional shape and size of the profiles (6) to be separated.

8 Claims, 4 Drawing Sheets

(56) References Cited

U.S. PATENT DOCUMENTS

Figure 1:
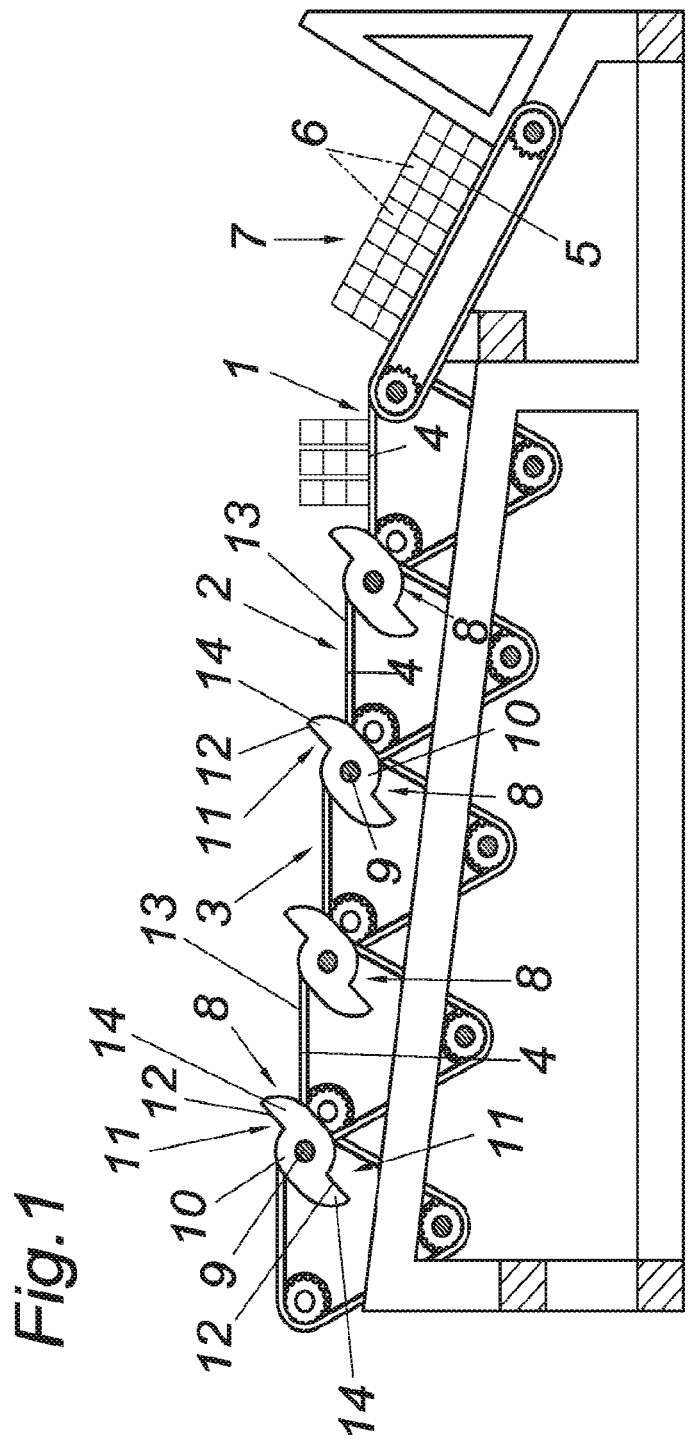

| | | | | |
|---|---|---|---|---|
| 4,431,367 | A * | 2/1984 | Pousette | B65G 47/53 |
| | | | | 198/463.6 |
| 4,662,506 | A * | 5/1987 | Tueckmantel | B65G 47/1478 |
| | | | | 414/745.9 |
| 5,813,512 | A * | 9/1998 | Andersson | B65G 47/846 |
| | | | | 198/459.5 |
| 5,921,376 | A * | 7/1999 | Michell | B65G 47/8823 |
| | | | | 198/476.1 |
| 6,082,523 | A * | 7/2000 | Weeks | B65G 47/244 |
| | | | | 198/374 |
| 6,220,423 | B1 * | 4/2001 | Gagnon | B65G 47/31 |
| | | | | 198/460.1 |
| 6,491,154 | B2 * | 12/2002 | Ydoate | B65G 47/31 |
| | | | | 198/444 |
| 10,246,267 | B2 * | 4/2019 | Ragan | B65G 43/08 |
| 10,988,327 | B1 * | 4/2021 | Layne | B65G 47/5181 |
| 2024/0217746 | A1 * | 7/2024 | Hundegger | B07C 5/14 |

* cited by examiner

SEPARATING APPARATUS FOR PROFILES

TECHNICAL FIELD

The invention relates to a separating device for profiles with transfer devices provided between supporting surfaces of successive transverse conveyors, which transfer devices have receptacles for a plurality of profiles which receptacles are displaceable in rotatry steps of a shaft between a pick-up position and a hand-over position and form a driver surface which in the pick-up position engages under only one profile.

STATE OF THE ART

Particularly in the case of stackable profiles with a pronounced longitudinal extension, there is a risk that, when several profiles taken from a stack are loaded onto a transverse conveyor, the profiles will come to lie not only next to one another but also on top of one another, which makes it difficult to separate the profiles by successively removing them from the transverse conveyor. In order to separate profiles that may lie on top of each other, it is known (U.S. Pat. No. 2,993,606) to provide several successive transverse conveyors in the form of sloping supporting surfaces forming a slideway and, between the supporting surfaces, transfer devices with transfer discs arranged on a shaft, which comprise receptacles for several profiles distributed over the circumference. These receptacles are bounded by approximately tangentially extending receptacle surfaces and radially extending driver surfaces between the receptacle surfaces. In a pick-up position, one of the driver surfaces engages under the profile that stops against the associated driver surface at the end of the sliding movement along the supporting surface. Provided that the bearing width of the profiles, i.e. the width of the supporting surface, corresponds to the radial extension of the driver surface, the profile resting against the receiving surface, together with any profiles resting on this profile, is lifted off the supporting surface of the transverse conveyor by the driver surface during a subsequent rotary step of the discs and transferred to the supporting surface of the continuing transverse conveyor. During the rotation step from the pick-up position to the handover position, the tangentially aligned receiving surface takes over the profiles lifted from the preceding transverse conveyor by the driving surface in a side-by-side arrangement, so that the uppermost of the profiles taken over lying on top of each other is transferred to the supporting surface of the receiving transverse conveyor as the first in the conveying direction. With the aid of the downstream transfer device, the profiles, which are now lined up next to each other, are transferred one after the other to a further transverse conveyor by successive driver surfaces.

A disadvantage, however, is that in order to accommodate profiles with different support widths, an adjustable stop must be assigned to the receptacles of the receiving device, which limits the effective radial length of the driver surfaces, so that the distance of the outer end of the driver surfaces from the stop upstream of the receiving surface determines the support width for which the separating device is set.

REPRESENTATION OF THE INVENTION

The invention is thus based on the task of designing a separating device for profiles in such a way that no additional, costly design measures are required for adaptation to profiles of the same cross-sectional shape but different support width.

Starting from a separating device of the type described at the beginning, the invention solves the problem posed in that characterised in that stop cams for the profiles are associated with the receptacles, in that stop points determining the contour of the stop cams define an angle of rotation of the stop cams and a distance from the bearing surface of the transverse conveyor, in that the rear boundary edge of the bearing surface, which is determined by the stop points as a function of the cross-sectional shape and size of the profiles, is at least at the same distance from the shaft as the outer end of the driver surface, and in that the transverse conveyors can be controlled as a function of the stop of the profiles at a stop cam rotated into the rotational position for the cross-sectional shape and size of the profiles to be separated.

For a given cross-sectional shape and size of the profiles to be separated, a contour point of a supported profile determines the position of its bearing surface in relation to the contour point. Accordingly, if a profile conveyed by a transverse conveyor strikes, preferably with a longitudinal edge, against a stop cam delimiting the conveying path, the position of the bearing surface of the profile on the transverse conveyor can be derived from the position of the stop cam. This applies to different cross-sectional dimensions if the stop points, in particular of a profile longitudinal edge for profile cross-sections of different sizes, determine the contour of the stop cam over a predetermined angle of rotation range, so that the stop point associated with a specific angle of rotation specifies the distance of the stop point from the supporting surface of the transverse conveyor and thus the height of the profile edge above the bearing surface for a specific cross-sectional shape and size.

In the rotational position for a given cross-sectional shape and size of the profiles to be separated, the conveying path of the profiles can thus be limited by such a stop cam in such a way that the rear boundary edge of the bearing surface of the stopping profile in the conveying direction is in a predetermined position. This means that if the contour of the stop cam is designed accordingly, the rear boundary edge of the bearing surface of the profiles to be stopped can be set to the same position for all sizes of profile cross section.

If the distance of the rear boundary edge of the profile support surface from the shaft of the transfer device is equal to the distance of the outer end of the driver surface from the shaft, then during a subsequent rotational step of the transfer device only the profile whose position on the transverse conveyor was determined by the stop cam and was released from the stop cam by the rotation of the transfer device with any profiles resting on this profile, is lifted off the transverse conveyor by the driver surface and fed to the continuing transverse conveyor, namely in the case of the takeover of several profiles due to the tilting rotation in the conveying direction one after the other, whereby the proper separation is ensured by the individual pick-up of the profiles which then successively stop against the stop cams of the following transfer device. To adapt to different cross-section sizes of the profiles to be separated, it is thus only necessary to rotate the transfer devices into an initial position in which the stop cams assume the angle of rotation for the respective cross-section size, and to control the transverse conveyors as a function of the stop position of the profiles in such a way that the stop position of the profiles is maintained until they are taken over by the transfer devices, i.e. that conveying by the transverse conveyor is interrupted for the transfer after the profile has stopped against the stop cam.

In order to lift only the profile, the position of which is determined by the stop cam, from the transverse conveyor by means of the driver surface, the distance of the outer end of the driver surface from the shaft must be at most equal to the distance of the rear boundary edge of the profile contact surface of the stopping profile from the shaft of the transfer device. A smaller distance is possible as long as the center of gravity of the profile is located above the driver surface receiving the profile. Under these conditions, it is also possible to separate profiles that deviate from a straight course. If necessary, the angle of rotation of the stop cam, which determines the stop position for such profiles, must be changed.

To increase the separation performance, the individual transfer devices are equipped with several receptacles and associated stop cams. In this case, it is recommended to provide the transfer devices with diametrically opposed receptacles and stop cams for the profiles.

Since the profiles are transferred to the subsequent transverse conveyors with the aid of the transfer devices over their shafts, simple design prerequisites result if the transverse conveyors are arranged offset from one another in height, rising in the conveying direction, so that, due to the height offset, simple conditions are achieved for profile transfer to the subsequent transverse conveyor, preferably rotated by approximately 90°.

BRIEF DESCRIPTION OF THE INVENTION

Figure 2:
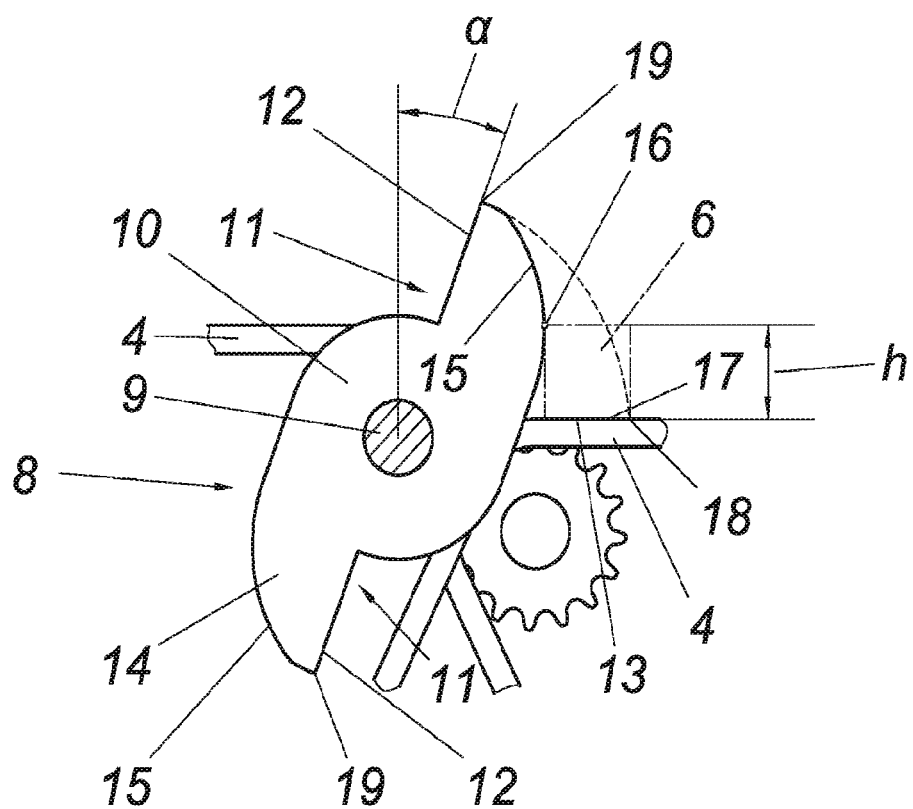
Figure 3:
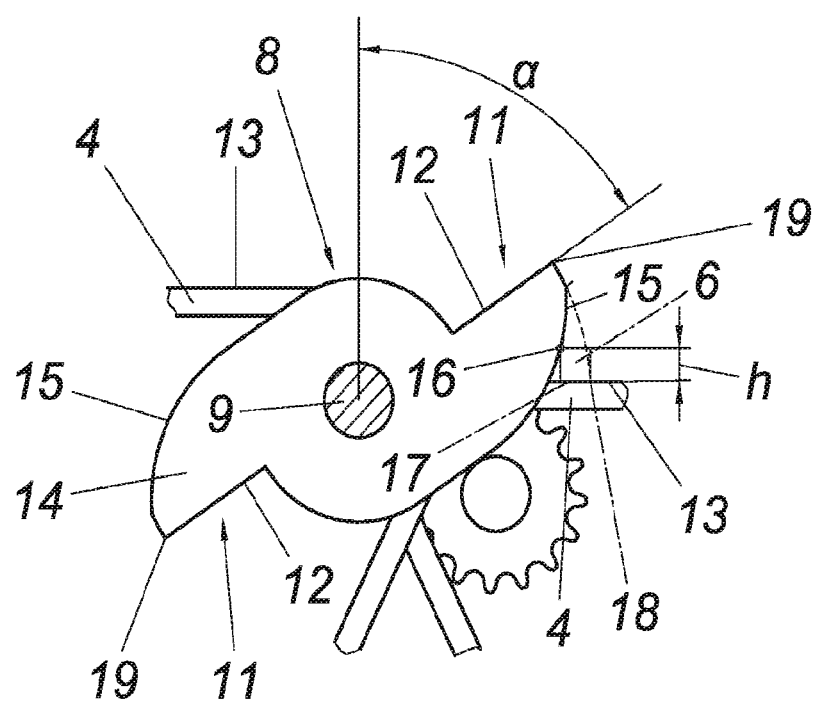
Figure 4:
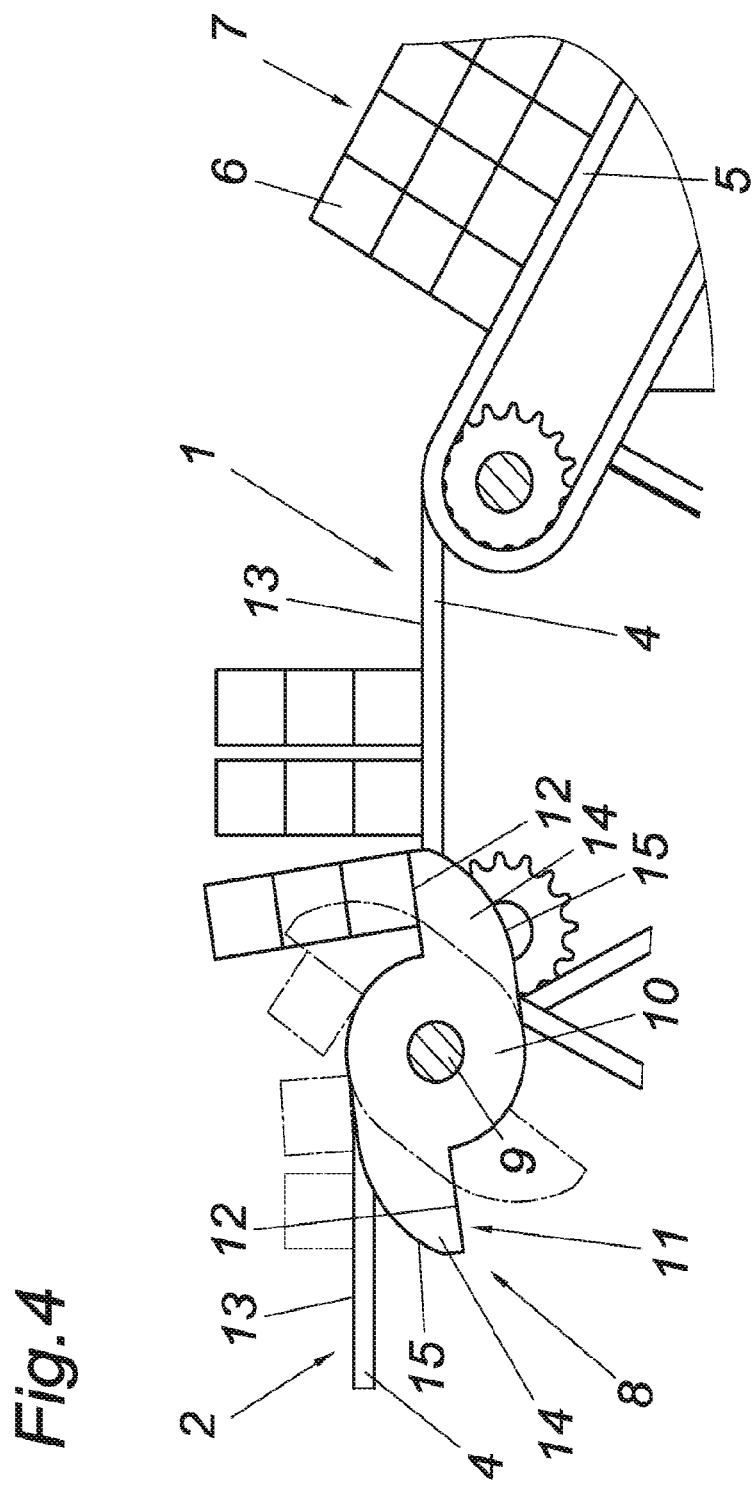

In the drawing, the object of the invention is shown by way of example. It shows FIG. 1 a schematic side view of a separating device according to the invention, and the FIGS. 2 to 4 show a transfer device in a schematic side view in several positions on a larger scale.

WAYS OF CARRYING OUT THE INVENTION

A separating device according to the invention has several transverse conveyors arranged one behind the other in the conveying direction, of which only the first three are provided with the reference signs 1, 2, 3. The transverse conveyor 1, which like the other transverse conveyors is constructed from circulatingly driven traction means 4, for example toothed belts or chains, arranged side by side at intervals, is fed via a feed conveyor 5 with profiles 6 of a profile stack 7 to be separated.

Transfer devices 8 are provided between the transverse conveyors to remove the profiles 6 from the preceding transverse conveyor and transfer them to the following transverse conveyor. These transfer devices 8 each have discs 10 seated on a common shaft 9, arranged between the traction means 4 and forming at least one receptacles 11 for several profiles 6. In the illustrated embodiment example, two diametrically opposite receptacles 11 are provided for each disc 10. The receptacles 11 are provided with a driver surface 12 extending in a plane containing the shaft 9. Since the shafts 9 also lie in a plane determined by the supporting surface 13 of the transverse conveyors delivering the profiles 6, in the pick-up position of the transfer devices 8 these driver surfaces 12 engage under the delivered profiles 6 resting on the supporting surface 13, so that during a rotational step of the transfer devices 8 these profiles 6 are lifted from the respective preceding transverse conveyor and transferred to the following transverse conveyor with a rotation of preferably 90°.

Stop cams 14 for the profiles 6 are assigned to the receptacles 11 on the side facing away from the driver surfaces 12. The contour 15 of these stop cams 14 is determined by stop points 16, which preferably result from a longitudinal edge of the profiles 6 due to different cross-sectional sizes of the profiles 6, if a separate angle of rotation a of the stop cam 14 is assigned to each stop point 16. Since the distance h of a stop point 16 from the supporting surface 13 of the transverse conveyor at a rotation angle α of the stop cam 14 associated with this stop point 16 corresponds to the height distance of the contour point of the profile 6 determining the stop point 16, preferably lying on a profile longitudinal edge, from its bearing surface 17, the stop cam 14 specifies a distance h of a profile longitudinal edge from the supporting surface 13 in a certain rotational position, so that the stop position of the profiles 6 is unambiguously determined with a corresponding height distance h of the profile longitudinal edge from the bearing surface 17.

This means that if the contour 15 of the stop cam 14 is designed accordingly, the distance of the rear boundary edge 18 in the conveying direction of the bearing surface 17 of the profile 6 resting on the stop cam 14 from the shaft 9 can be matched to the distance of the outer end 19 of the driver surface 12 from the shaft 9, as shown in FIGS. 2 and 3 for two profiles 6 of different sizes that are square in cross section for simplicity. The conveying distance on the transverse conveyor preceding the transfer device 8, which is limited by the stop cam 14 due to its rotational position as a function of the size of the profile cross section, thus ensures that during a subsequent rotational step of the transfer device 8 only the foremost profile 6 is lifted off the transverse conveyor by the driver surface 12, but not also a subsequent one, because the contour 15 of the stop cam 14 limits the conveying distance of the profiles 6 with different cross-sections in such a way that the position of the rear boundary edge 17 of the bearing surface of the stopping profile 6 is the same for all cross-section sizes.

FIG. 4 is used to explain in more detail the separation of the profiles 6 in the event that several profiles 6 from the profile stack 7 come to lie on top of each other on the transverse conveyor 1. The conveying path of the foremost profile 6 with the profiles 6 resting on it is limited by a stop cam 14 of the transfer device 8 between the transverse conveyors 1 and 2 in the manner described above in such a way that the driver surface 12 engaging under the foremost profile 6 during the subsequent rotary step of the transfer device 8 lifts only this foremost profile 6 with the profiles 6 resting on it off the transverse conveyor 1. During the rotation of the transfer device 8, the profiles 6 lying on top of each other are tipped onto the adjoining transverse conveyor 2 with a rotation so that they generally come to rest one behind the other on the transverse conveyor 2. On the transverse conveyor 2, the profiles 6 are fed to the transfer device 8 to the transverse conveyor 3, this transfer device 8 again limiting the conveying path of the foremost profile 6 on the transverse conveyor 2 with the aid of a correspondingly rotationally adjusted stop cam 14 in such a way that with the subsequent rotational step only the foremost profile 6 can be gripped by the driver surface 12 of the receptacles 11. After this transfer of the foremost profile 6, the following profiles 6 are individually gripped in analogous manner one after the other by the transfer device 8 between the transverse conveyors 2, 3 and transferred to the transverse conveyor 3, from which they can be removed individually.

Since the profiles 6 are rotated about their longitudinal axis by the transfer device 8 when they are transferred to a subsequent transverse conveyor, it may be necessary to provide stop cams 14 with a curve profile 15 adapted to the rotated profile cross section for the transfer device 8 following the continuing transverse conveyor.

If profiles 6 are still lying on top of each other in the area of the transverse conveyor 2 or 3, these superimposed profiles 6 are separated in the manner described in connection with the transverse conveyor 1.

The invention claimed is:

1. A separating device for profiles, said separating device comprising:
  - transfer devices between supporting surfaces of successive transverse conveyors;
  - said transfer devices each having receptacles configured to receive a plurality of said profiles;
  - said receptacles being displaceable in rotary steps of a shaft between a pick-up position and a handover position, and each forming a driver surface that in the pick-up position engages under only one, of said profiles;
  - wherein stop cams are associated with the receptacles;
  - wherein stop points on a contour of the stop cams each define a respective angle of rotation of the stop cams and a corresponding distance from a bearing surface of at least one transverse conveyor;
  - wherein a rear boundary edge of the bearing surface, which is determined by the stop points as a function of a cross-sectional shape and size of the profiles, is at a distance from the shaft that is equal to or greater than a distance from the shaft to an outer end of the driver surface; and
  - wherein the transverse conveyors are controlled as a function of stopping of the profiles at an associated stop cam rotated into a rotational position for the cross-sectional shape and size of the profiles to be separated.

2. The separating device according to claim 1, wherein the transfer devices have diametrically opposite receptacles for the profiles.

3. The separating device according to claim 1, wherein the transverse conveyors are arranged offset from one another in height, rising in a conveying direction.

4. The separating device according to claim 2, wherein the transverse conveyors are arranged offset from one another in height, rising in a conveying direction.

5. A separating device for processing profiles, said separating device comprising:
  - a plurality of successive transverse conveyors each having respective supporting surfaces configured to support and convey the profiles in a conveying direction;
  - a plurality of transfer devices supported between the transverse conveyors;
  - the transfer devices each having a respective receptacle configured to receive one of the profiles;
  - wherein the receptacles are each rotatably displaceable by a shaft between a pick-up position and a handover position, each of the receptacles having a respective driver surface that in the pick-up position engages under only one of said profiles;
  - wherein the receptacles are each associated with a respective stop cam having a contour with stop points thereon configured to contact an associated one of the profiles;
  - said stop points each being at a respective distance above a bearing surface of an adjacent one of the transverse conveyors when the stop cam is rotated to a respective corresponding angle of rotation of the stop cam;
  - the stop cam being rotated into a rotational position selected based on a cross-sectional shape and size of the profiles to be separated such that a distance to a rear boundary edge on the bearing surface at a rear edge of a first of the profiles stopped at the contour of the stop cam is greater than or equal to a distance from the shaft to an outer end of the driver surface, and such that the driver surface in the pick-up position engages under and picks up only said first of the profiles without lifting any of said profiles rearward of the first of the profiles; and
  - wherein the transverse conveyors are controlled as a function of stopping of the profiles by the stop cam in said rotational position selected for the cross-sectional shape and size of the profiles to be separated.

6. The separating device according to claim 5, wherein the transfer devices each have two diametrically opposite receptacles configured to receive the profiles.

7. The separating device according to claim 5, wherein the transverse conveyors are arranged offset from one another in height, rising in the conveying direction.

8. The separating device according to claim 6, wherein the transverse conveyors are arranged offset from one another in height, rising in the conveying direction.

* * * * *